United States Patent
Leedberg et al.

(10) Patent No.: US 7,970,814 B2
(45) Date of Patent: Jun. 28, 2011

(54) METHOD AND APPARATUS FOR PROVIDING A SYNCHRONOUS INTERFACE FOR AN ASYNCHRONOUS SERVICE

(75) Inventors: Gregory Leedberg, Milton, MA (US); Kenneth D. Carey, Boston, MA (US); George W. Spencer, Jr., Westborough, MA (US)

(73) Assignee: Raytheon Company, Waltham, MA (US)

( * ) Notice: Subject to any disclaimer, the term of this patent is extended or adjusted under 35 U.S.C. 154(b) by 219 days.

(21) Appl. No.: 12/468,100

(22) Filed: May 19, 2009

(65) Prior Publication Data
US 2009/0292765 A1      Nov. 26, 2009

Related U.S. Application Data

(60) Provisional application No. 61/128,460, filed on May 20, 2008.

(51) Int. Cl.
*G06F 15/16*     (2006.01)
(52) U.S. Cl. ......... 709/202; 709/215; 710/260; 710/240
(58) Field of Classification Search .................... 709/202
See application file for complete search history.

(56) References Cited

U.S. PATENT DOCUMENTS

| | | |
|---|---|---|
| 5,086,394 A | 2/1992 | Shapira |
| 5,434,975 A * | 7/1995 | Allen ............................ 719/312 |
| 5,619,648 A | 4/1997 | Canale et al. |
| 5,704,017 A | 12/1997 | Heckerman et al. |
| 6,073,142 A | 6/2000 | Geiger et al. |
| 6,101,531 A | 8/2000 | Eggleston et al. |
| 6,157,915 A | 12/2000 | Bhaskaran et al. |
| 6,330,610 B1 | 12/2001 | Docter et al. |
| 6,336,134 B1 | 1/2002 | Varma |
| 6,643,705 B1 | 11/2003 | Wallace et al. |
| 6,778,941 B1 | 8/2004 | Worrell et al. |
| 6,832,245 B1 | 12/2004 | Isaacs et al. |
| 6,886,169 B2 | 4/2005 | Wei |
| 6,968,179 B1 | 11/2005 | De Vries |
| 7,152,111 B2 | 12/2006 | Allred et al. |
| 7,185,057 B2 | 2/2007 | Brown et al. |

(Continued)

FOREIGN PATENT DOCUMENTS

EP      1 193 925 A2      4/2002

(Continued)

OTHER PUBLICATIONS

Nokia Discussion, "Need to wait async function complete before can go on", Feb. 2006, Forum.Nokia, Discussion Board, all pages.*

(Continued)

*Primary Examiner* — Rupal D Dharia
*Assistant Examiner* — Hua Fan
(74) *Attorney, Agent, or Firm* — Daly, Crowley, Mofford & Durkee, LLP

(57) ABSTRACT

Methods and apparatus for providing a synchronous interface for an asynchronous service including, in a synchronous interface engine executing on a processor, receiving a request from a client for the asynchronous service, issuing an asynchronous service request to perform the asynchronous service, the asynchronous service request including a unique client identifier, and associating a wait condition with the unique client identifier to indicate to the client to wait for a result of the asynchronous service. Methods and apparatus further include receiving the result of the asynchronous service, the result including the unique client identifier, removing the associated wait condition, and sending the result to the client.

14 Claims, 8 Drawing Sheets

U.S. PATENT DOCUMENTS

| | | | |
|---|---|---|---|
| 7,249,162 | B2 | 7/2007 | Rounthwaite et al. |
| 7,299,264 | B2 | 11/2007 | Yang-Huffman |
| 7,343,564 | B2 | 3/2008 | Othmer |
| 7,363,319 | B2 | 4/2008 | Cappellini |
| 7,369,505 | B2 | 5/2008 | Mengerink |
| 7,370,283 | B2 | 5/2008 | Othmer |
| 7,383,307 | B2 | 6/2008 | Kirkland et al. |
| 7,430,724 | B2 | 9/2008 | Othmer |
| 7,437,408 | B2 | 10/2008 | Schwartz et al. |
| 7,441,203 | B2 | 10/2008 | Othmer et al. |
| 7,511,634 | B2 | 3/2009 | Stehle et al. |
| 7,512,569 | B2 | 3/2009 | Isaacs |
| 7,523,137 | B2 | 4/2009 | Kass et al. |
| 7,523,226 | B2 | 4/2009 | Anderson et al. |
| 7,526,573 | B2 | 4/2009 | Busey |
| 7,574,170 | B2 | 8/2009 | Jendbro |
| 7,574,479 | B2 | 8/2009 | Morris et al. |
| 7,581,166 | B2 | 8/2009 | Renger et al. |
| 7,590,691 | B2 | 9/2009 | Gonsalves et al. |
| 7,603,437 | B2 | 10/2009 | Busey |
| 7,739,656 | B2 * | 6/2010 | Beisiegel et al. ............ 717/106 |
| 2001/0046069 | A1 | 11/2001 | Jones |
| 2002/0083127 | A1 | 6/2002 | Agrawal |
| 2005/0055403 | A1 | 3/2005 | Brittan |
| 2005/0193062 | A1 | 9/2005 | Komine et al. |
| 2005/0234928 | A1 | 10/2005 | Shkvarchuk |
| 2005/0250552 | A1 | 11/2005 | Eagle et al. |
| 2005/0267974 | A1 | 12/2005 | Panasyuk et al. |
| 2006/0073812 | A1 | 4/2006 | Venkata |
| 2006/0133385 | A1 | 6/2006 | Trossen et al. |
| 2006/0173985 | A1 | 8/2006 | Moore |
| 2006/0230021 | A1 | 10/2006 | Diab et al. |
| 2006/0259474 | A1 | 11/2006 | Granito |
| 2006/0265489 | A1 | 11/2006 | Moore |
| 2007/0083536 | A1 | 4/2007 | Darnell et al. |
| 2007/0083894 | A1 | 4/2007 | Gonsalves et al. |
| 2007/0100836 | A1 | 5/2007 | Eichstaedt et al. |
| 2007/0100959 | A1 | 5/2007 | Eichstaedt et al. |
| 2007/0100960 | A1 | 5/2007 | Eichstaedt et al. |
| 2007/0130158 | A1 | 6/2007 | LaBiche et al. |
| 2007/0162432 | A1 | 7/2007 | Armstrong et al. |
| 2007/0162560 | A1 | 7/2007 | Jin |
| 2007/0168461 | A1 | 7/2007 | Moore |
| 2007/0174389 | A1 | 7/2007 | Armstrong et al. |
| 2007/0203977 | A1 | 8/2007 | Wu et al. |
| 2007/0225047 | A1 | 9/2007 | Bakos |
| 2008/0010353 | A1 | 1/2008 | Rounthwaite et al. |
| 2008/0046369 | A1 | 2/2008 | Wood |
| 2008/0059964 | A1 | 3/2008 | Khodabakchian et al. |
| 2008/0104226 | A1 | 5/2008 | Seshasai |
| 2008/0104520 | A1 | 5/2008 | Swenson et al. |
| 2008/0126476 | A1 | 5/2008 | Nicholas et al. |
| 2008/0208972 | A1 | 8/2008 | Chou et al. |
| 2009/0061925 | A1 | 3/2009 | Finkelstein et al. |
| 2009/0070419 | A1 | 3/2009 | Gilfix et al. |
| 2009/0089380 | A1 | 4/2009 | Wang et al. |
| 2009/0172773 | A1 | 7/2009 | Moore |
| 2009/0182805 | A1 * | 7/2009 | Shivaji-Rao ................ 709/203 |
| 2009/0248729 | A1 | 10/2009 | Bruno, Jr. et al. |

FOREIGN PATENT DOCUMENTS

| | | |
|---|---|---|
| EP | 1 193 925 A3 | 4/2002 |
| EP | 1 883 019 A1 | 1/2008 |
| GB | 2 313 524 A | 11/1997 |
| WO | WO 01/98856 A2 | 12/2001 |
| WO | WO 01/98856 A3 | 12/2001 |
| WO | WO 2004/031976 A1 | 4/2004 |
| WO | WO 2005/083934 A1 | 9/2005 |
| WO | WO 2005/125070 A2 | 12/2005 |
| WO | WO 2005/125070 A3 | 12/2005 |
| WO | WO 2006/088952 A2 | 8/2006 |
| WO | WO 2006/088952 A3 | 8/2006 |
| WO | WO 2007/147207 A1 | 12/2007 |

OTHER PUBLICATIONS

Haustein et al, "A lock Manager for Collaborative Processing of Natively Stored XML Documents", 2004, University of Kaiserslautern, all pages.*
Notification of Transmittal of the International Search Report and the Written Opinion of the International Searching Authority, or the Declaration, PCT/US2009/044451 dated Oct. 6, 2009, 3 pages.
International Search Report, Form PCT/ISA/210, PCT/US2009/044451 dated Oct. 6, 2009, 4 pages.
Written Opinion of the International Searching Authority, PCT/US2009/044451 dated Oct. 6, 2009, 6 pages.
Notification Concerning Transmittal of International Preliminary Report on Patentability (Chapter 1 of the Patent Cooperation Treaty), PCT/US2009/044451, date of mailing Dec. 2, 2010, 2 pages.
Written Opinion of the International Searching Authority, PCT/US2009/044451, date of mailing Dec. 2, 2010, 5 pages.
Notification Concerning Transmittal of International Preliminary Report on Patentability (Chapter 1 of the Patent Cooperation Treaty), PCT/US2009/044450, date of mailing Dec. 2, 2010, 2 pages.
Notification of Transmittal of the International Search Report and the Written Opinion of the International Searching Authority, or the Declaration, PCT/US2009/044450 dated Oct. 6, 2009, 3 pages.
International Search Report Form PCT/ISA/210, PCT/US2009/044450 dated Oct. 6, 2009, 4 pages pages.
Written Opinion of the International Searching Authority, PCT/US2009/044450 dated Oct. 6, 2009, 5 pages.
Notification of Transmittal of The International Search Report and the Written Opinion of the International Searching Authority, or the Declaration/International Search Report, PCT/US09/44453, date of mailing Jun. 15, 2010, 3 pages.
Written Opinion of the International Searching Authority, PCT/US09/44453, date of mailing Jun. 15, 2010, 4 pages.
Notification Concerning Transmittal of the International Preliminary Report on Patentability (Chapter 1 of the Patent Cooperation Treaty)/International Preliminary Report on Patentability, PCT/US2009/044453, date of mailing Dec. 2, 2010, 2 pages.
Notification of Transmittal of the International Search Report and the Written Opinion of the International Searching Authority, or the Declaration, PCT/US2009/044454 dated Jul. 30, 2009, 3 pages.
International Search Report, PCT/US2009/044454 dated Jul. 30, 2009, 4 pages.
Written Opinion of the International Searching Authority, PCT/US2009/044454 dated Jul. 30, 2009, 9 pages.
Notification Concerning Transmittal of International Preliminary Report on Patentability (Chapter 1 of the Patent Cooperation Treaty), PCT/US2009/044454, date of mailing Dec. 2, 2010, 2 pages.
Written Opinion of the International Searching Authority, PCT/US2009/044454, date of mailing Dec. 2, 2010, 7 pages.
Notification of Transmittal of the International Search Report and the Written Opinion of the International Searching Authority, or the Declaration, PCT/US2009/044452, dated Aug. 12, 2009, 3 pages.
International Search Report, PCT/US2009/044452, dated Aug. 12, 2009, 4 pages.
Written Opinion of the International Searching Authority, PCT/US2009/044452), dated Aug. 12, 2009, 6 pages.
U.S. Appl. No. 12/468,099, Gregory Leedberg, et al., filed May 19, 2009, 35 pages.
U.S. Appl. No. 12/468,101, Gregory Leedberg, et al., filed May 19, 2009, 30 pages.
U.S. Appl. No. 12/468,112, Gregory Leedberg, et al., filed May 19, 2009, 33 pages.
U.S. Appl. No. 12/468,116, Kenneth D. Carey, et al., filed May 19, 2009, 41 pages.
"Love: Japanese Style", Yukari Iwatani, Wired Magazine Online, Jun. 11, 1998, 2 pages, http://www.wired.com/culture/lifestyle/news/1998/06/12899, last accessed Jan. 13, 2011.
"Social Serendipity", MIT Media Lab: Reality Mining, Mar. 9, 2009, 10 pages, http://reality.media.mit.edu/serendipity.php, last accessed Jan. 13, 2011.

King et al.: "An alternative implementation of the reference monitor concept (military messaging, secure)" Proceedings of the Aerospace Computer Security Applications Conference. Orlando, Dec. 12-16, 1988; Washington, IEEE Comp. Soc.Press, US, vol. Conf. 4, Dec. 12, 1988, pp. 159-166, XP010014556. ISBN: 978-0-8186-0895-7, p. 160, right-hand column, line 25-line 39; p. 163, left-hand column, line 46-right-hand column, line 37.

Brok J. et al: "Enabling New Services by Exploiting Presence and Context Information in IMS", Bell Labs Technical Journal, Wiley, CA, US, vol. 4, No. 10, Jan. 1, 2006, pp. 83-100, XP001239288, ISSN: 1089-7089.

3GPP: "$3^{rd}$ Generation Partnership Project; Technical Specification Group Services and System Aspects; Presence Service; Architecture and functional description (release 6)", 3GPP TS 23.141 v. 6.1.0, (Dec. 2002) Technical Specification; $3^{rd}$ Generation Partnership Project (3GPP), Mobile Competence Centre; 650, Route Des Lucioles; F-06921 Sophia-Antipolis Cedex; France, vol. SA WG5, no. Sophia Antipolis, France; 20030120, Jan. 10, 2003, XP050295829, pp. 1-31.

* cited by examiner

METHOD AND APPARATUS FOR PROVIDING A SYNCHRONOUS INTERFACE FOR AN ASYNCHRONOUS SERVICE

RELATED APPLICATIONS

This application claims the benefit of U.S. Provisional Application No. 61/128,460 filed May 20, 2008 under 35 U.S.C. §119(e) which application is hereby incorporated herein by reference in its entirety.

BACKGROUND

As is known in the arts, two primary modes of interaction include synchronous and asynchronous programming. In a synchronous function, a client calls the function and waits for the function to return after the function performs any required actions. In contrast, in an asynchronous function, a client calls the function but does not wait for the function to return. Rather, the client continues to execute and the asynchronous function "calls back" the client to return results when complete.

Certain types of clients require and/or are better-suited for one or the other type of programming (i.e., synchronous or asynchronous programming). For example, a program subject to operational time-constraints may require synchronous functionality. One example is a video processing service (such as one used by an embedded processor in a television) that must retrieve and process data within video refresh rates (e.g., 29.97 frames per second defined by the National Television System Committee). Such a client is best-suited for synchronous functionality (at least for the "real-time" response component) that operates within the limited time constraints.

Other types of clients require synchronous processing because they must obtain a result before execution can continue. For example, a geo-coding service may generate route directions from a starting location to a desired location by identifying a sequence of streets using a reverse lookup service on way points along the route. The geo-coding service must wait for the reverse-lookup service to return the next street (or a group of streets) in the sequence based upon the way points. Here, the geo-coding service requires a synchronous function call to the reverse-lookup service because it cannot continue to process the route without the identifying the next street.

In contrast, many other types of clients are better-suited for asynchronous services because they don't need or desire an immediate response to continue execution and/or they expect that a service or function will take some time to complete and/or must share a limited resource controlled by service with other clients. In one example, a client requests a batch process to execute on a server with the expectation that the batch process will take some time to finish. Here, the client sends the batch process to the server and does not wait for a response, in effect, placing the batch process in the background, while continuing with other tasks. For example, the client may continue to process user input. When the server completes the batch process, it returns the results to the client.

In another asynchronous service example, the client may be an image-editing program that enables different image editing functions on an image by issuing image-editing requests to an image server. For example, the image-editing program may issue a batch of functions to the image server, such as: "copy image A to image B"; "reduce size of image B"; "convert image B to format X", and; "return image B." The image server performs the batch functions and when complete calls back the image-editing program to return the results (i.e., image B). Such an example may apply to rendering systems in which rendering multiple images of a video clip requires minutes, hours, or days to complete.

As is also known in the art, web clients issue requests for content to a web server over the Internet. Although web client users desire to receive the content as soon as possible, they often must wait for the server to send the content, either because the server is busy handling other requests from other users or because of an overloaded network. If the server takes too long to respond, clients may "time-out" and stop waiting for the server, which may result in an error message on a client that the server did not respond. For example, web browsers (e.g. Internet Explorer™ manufactured by Microsoft Corporation of Redmond, Wash.) produce a time-out error message after a web server fails to respond to a request within a so-called "time-out limit" (e.g., 5 minutes, 60 seconds, 30 seconds, etc.).

A problem in the conventional art occurs when clients require and/or are better-suited for synchronous functions, but only asynchronous services exist to process the functions. In such cases, clients may terminate early, become unstable, or may not meet certain operational constraints or preferences.

SUMMARY

In general overview, the inventive concepts described herein provide a synchronous interface for an asynchronous service. A client that requires or desires a synchronous function but must call an asynchronous service to perform the function, may use the synchronous interface to act on its behalf as if the client were calling a synchronous function. The synchronous interface handles interactions with the asynchronous service and returns results to the client.

In one embodiment, the synchronous interface receives a request from a client to perform an asynchronous service. The synchronous interface causes the client to wait and issues a request to the asynchronous service to perform a function. When the asynchronous service completes the function, it calls back the synchronous interface and returns a result. The synchronous interface returns the result (i.e., forwards the result) to the client, and causes the client to stop waiting.

Examples of clients and asynchronous services include, but are not limited to, web clients such as a web browser that requests asynchronous services on servers, application servers that call asynchronous services on other servers, and application processes that call asynchronous operating system services. For example, a client may need to obtain a list of users from a server that processes requests asynchronously. However, the client desires an immediate or near immediate response because it cannot continue to execute a task until it obtains the list of users. In this instance, the client may use the synchronous interface to call the asynchronous service as if were calling a synchronous function. Although the client may still have to wait for a response, the synchronous interface allows the client to treat the request as if it were a synchronous function, which can provide more stability, predicable behavior, and/or prevent early termination.

Other environments are limited to one or the other type of functionality. For example, a client may only be able to issue synchronous requests, such as requests with precise time-limitations. Alternatively, certain services, such Extensible Messaging and Presence Protocol (XMPP) generally provide only asynchronous services.

In accordance with an embodiment of the invention, a method for providing a synchronous interface for an asynchronous service includes in a synchronous interface engine executing on a processor to provide the synchronous interface, receiving a request from a client for the asynchronous service, issuing an asynchronous service request to perform the asynchronous service, the asynchronous service request including a unique client identifier, and associating a wait condition with the unique client identifier to indicate to the client to wait for a result of the asynchronous service. The method further includes receiving the result of the asynchronous service, the result including the unique client identifier, removing the associated wait condition, and sending the result to the client.

In further embodiments, the method can include one or more of the following features: associating the wait condition with a semaphore, acquiring the semaphore, and removing the associated wait condition includes releasing the semaphore; the client waits until the semaphore is released; the client request includes a plurality of requests, ones of the requests originating from different clients, the unique client identifier includes a plurality of unique client identifiers for the ones of the requests, and the associated wait condition includes a plurality of associated wait conditions for ones of the unique client identifiers; associating the wait condition further includes representing the ones of the requests in a row of a hash table including the unique client identifier, and the semaphore representing the associated wait condition, and removing the associated wait condition further includes locating the resulting unique client identifier in a hash table row and releasing the semaphore represented in the hash table row.

In another aspect, an embodiment of the invention includes a method or apparatus for providing a synchronous interface for an asynchronous service including a synchronous interface engine executing on a processor. The synchronous interface engine includes an asynchronous request broker to receive a request from a client for the asynchronous service, associate a unique client identifier with the client, and issue an asynchronous service request to perform the asynchronous service, the asynchronous service request including the unique client identifier. The synchronous interface engine further includes a wait condition processor to associate a wait condition with the unique client identifier to indicate to the client to wait for a result of the asynchronous service. Further, an asynchronous result broker receives the result of the asynchronous service, the result including the unique client identifier. The asynchronous result broker removes the associated wait condition and the wait condition processor sends the result to the client.

In further embodiments, the method or apparatus can include one or more of the following features: the wait condition processor is acquires a semaphore to represent the associated wait condition, and the asynchronous result broker releases the semaphore to remove the associated wait condition; the wait condition processor waits until the semaphore is released; the wait condition processor represents the request in a row of a hash table including the unique client identifier, and the semaphore representing the associated wait condition, and the asynchronous result broker locates the resulting unique client identifier in a hash table row and release the semaphore represented in the hash table row.

In another aspect, an embodiment of the invention includes an article including a storage medium having stored instructions thereon that when executed by a machine result in a synchronous interface for an asynchronous service. The synchronous interface enables receiving a request from a client for the asynchronous service, issuing an asynchronous service request to perform the asynchronous service, the asynchronous service request including a unique client identifier, associating a wait condition with the unique client identifier to indicate to the client to wait for a result of the asynchronous service, receiving the result of the asynchronous service, the result including the unique client identifier, removing the associated wait condition, and sending the result to the client.

In further embodiments, the article can include one or more of the following features: associating the wait condition with a semaphore, acquiring the semaphore, and removing the associated wait condition includes releasing the semaphore; the client waits until the semaphore is released; the client request includes a plurality of requests, ones of the requests originating from different clients, the unique client identifier includes a plurality of unique client identifiers for the ones of the requests, and the associated wait condition includes a plurality of associated wait conditions for the ones of the unique client identifiers; associating the wait condition further includes representing the ones of the requests in a row of a hash table including the unique client identifier, and the semaphore representing the associated wait condition, and removing the associated wait condition further includes locating the resulting unique client identifier in a hash table row and releasing the semaphore represented in the hash table row.

BRIEF DESCRIPTION OF THE DRAWINGS

The foregoing features of this invention, as well as the invention itself, may be more fully understood from the following description of the drawings in which.

DETAILED DESCRIPTION

Figure 1:
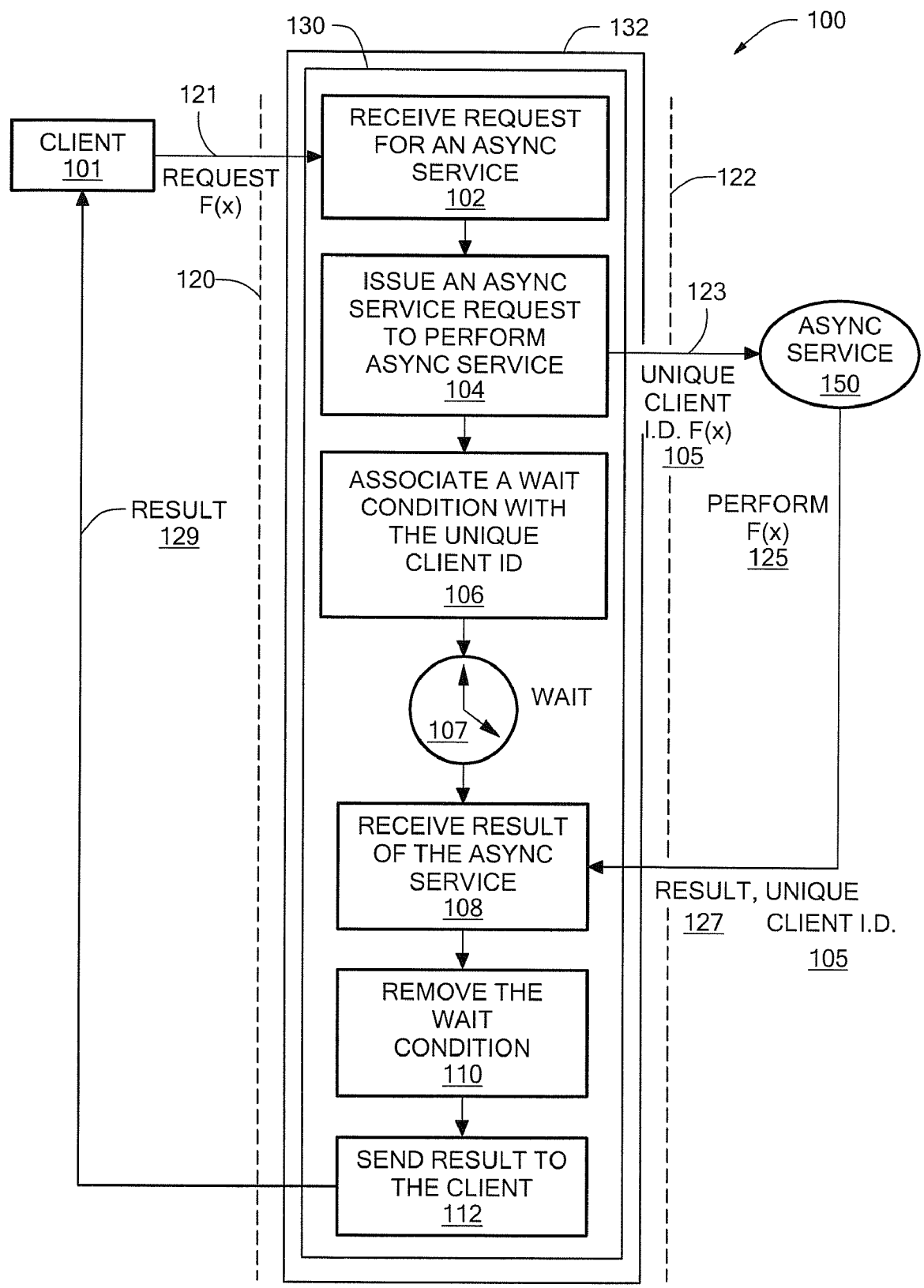
FIG. 1 is a flow diagram of a method for providing a synchronous interface for an asynchronous service.

Referring to FIG. 1, a method 100 for providing a synchronous interface 132 for an asynchronous service includes receiving a request from a client 101 for the asynchronous service (step 102), issuing an asynchronous service request to perform the asynchronous service (step 104), the asynchronous service request including a unique client identifier 105, and associating a wait condition with the unique client identifier (step 106) to indicate to the client 101 to wait for a result of the asynchronous service 150. The method further includes receiving the result of the asynchronous service (step 108), the result including the unique client identifier 105, removing the associated wait condition (step 110), and sending the result to the client (step 112).

As described above, the synchronous interface 132 allows the client 101 to issue an asynchronous service 150, but act as if it had issued a synchronous function. In one embodiment, the asynchronous service 150 provides various client functions and services. For example, the asynchronous service 150 may provide collaborative messaging functions, such those provided by an Extensible Messaging and Presence Protocol (XMPP) service.

Referring again to FIG. 1, in one embodiment of the method 100, a client 101 issues a request 121 to perform a function (denoted in FIG. 1 by $f(x)$) to a synchronous interface engine 130 over a network 120, which includes, but is not limited to, the Internet or an intranet. The synchronous interface engine 130 receives the request 121 and issues a request 123 to an asynchronous service 150 to perform $f(x)$. The request 123 may be issued over another network 122, as may be similar to network 120. The request 123 includes a unique client identifier 105 that identifies the requesting client 101.

The synchronous interface engine 130 associates a wait condition with the unique client identifier 105 and waits for the asynchronous service 150 to return. The asynchronous service 150 performs $f(x)$ 125 and returns a result 127 along with the unique client identifier 105. Upon return, the synchronous interface engine 130 removes the wait condition associated with the unique client identifier 105 and sends the result 129 back to the client 101.

It will be understood by one of ordinary skill in the art that in one embodiment, the client 101 and synchronous interface engine 130 execute on the same computer. Furthermore, in the same or different embodiment, the synchronous interface engine 130 and the asynchronous service 150 execute on the same computer.

As is known in the art, a semaphore is a variable stored in a computer memory and operations on the semaphore include atomic operations which must not be interrupted. For example, operations to acquire and release the semaphore are atomic. Such operations are described in detail below.

In a further embodiment, the method includes associating the wait condition with a semaphore, acquiring the semaphore, and removing the associated wait condition includes releasing the semaphore. The wait condition is associated with the semaphore to ensure that the client 101 waits until the asynchronous service 150 has completed.

In particular, in this embodiment, the synchronous interface engine 130 further represents the wait condition with a semaphore, which includes acquiring and blocking the semaphore. When the asynchronous service 150 returns, the synchronous interface engine 130 unblocks and releases the semaphore. Use of the semaphore prevents other functions from acquiring and releasing the semaphore prematurely before the asynchronous service 150 returns, which can produce early termination and/or instability in the client 101. It may also produce undesirable behavior in the client, for example, by not fully completing a desired command or operation that depends on the asynchronous service.

Operation of the semaphore will now be described in more detail. The semaphore may be initialized and acquired as exemplified in the following:

```
SemAcquire( Semaphore s)
{
    s = null;
    do while(s == null){ };
}
```

Here, the value of the semaphore starts out as the null value. The synchronous interface engine acquires the semaphore and busy waits for the asynchronous service to return with a result. The synchronous interface engine releases the semaphore by unblocking it when the asynchronous service returns, as exemplified in the following:

```
SemRelease(Semaphore s, result r)
{
    s = r;
}
```

Here, the synchronous interface engine calls SemRelease and sets it to the result value. The code that is busy-waiting on the semaphore exits out of the busy-wait condition.

In a further embodiment, the synchronous interface engine includes a plurality of engines which execute in parallel. For example, a first one of the engines may busy-wait on a first asynchronous service, a second one of the engines may busy-wait on a second asynchronous service, and a third one of the engines may respond to client requests, acquire semaphores, and/or release semaphores. The first and second ones of the engine may be child processes forked off of the third one of the engines, which may be a parent process. The first and second ones of the engine may be terminated upon return of the respective first and second asynchronous services, upon release of respective semaphores. Still further, the third one of the engines may acquire semaphores while a fourth one of the engines may release semaphores upon notification that an asynchronous service has returned.

Figure 2:
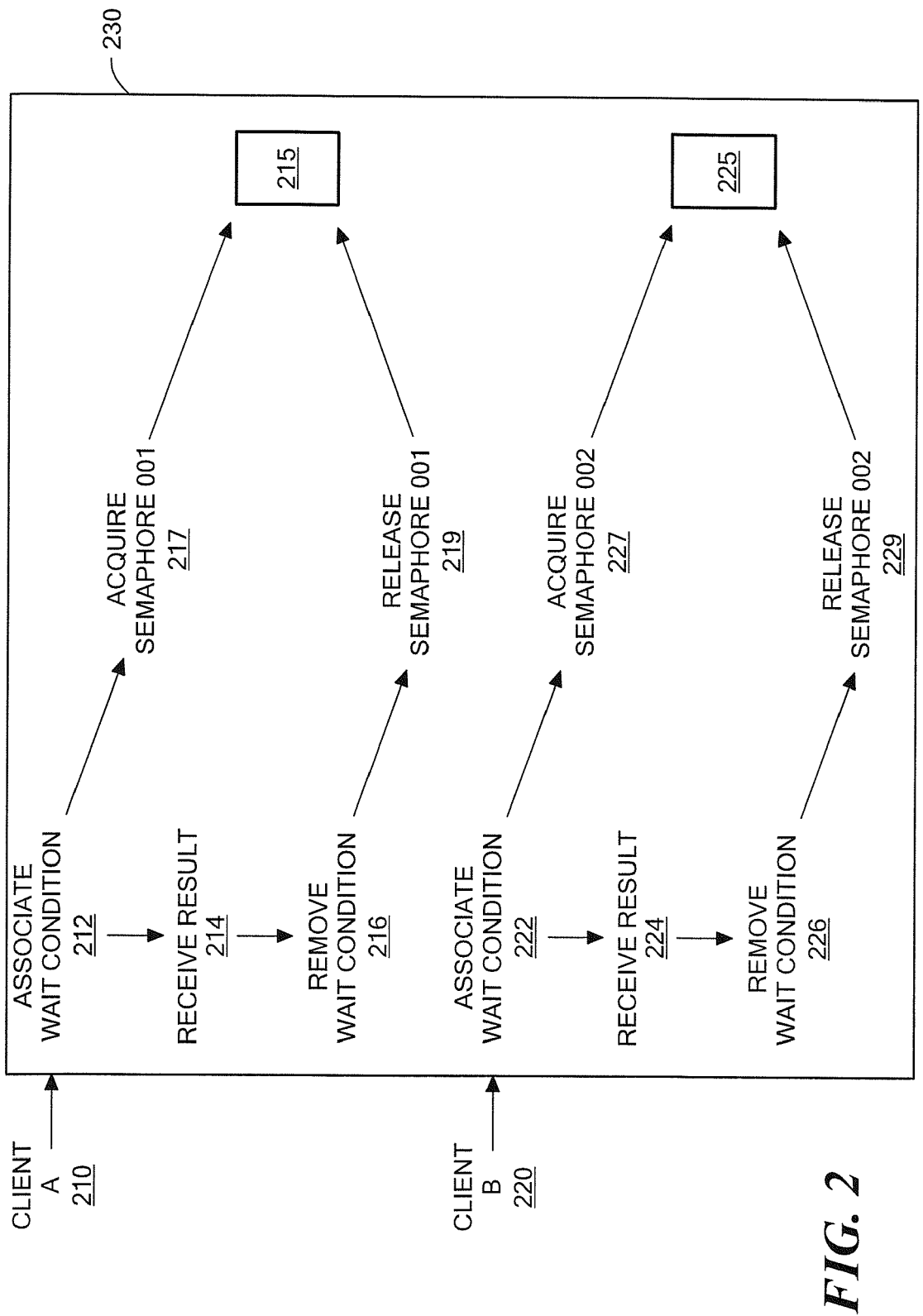
FIG. 2 is a block diagram depicting associated wait conditions and semaphores for clients in an exemplary embodiment of the inventive concepts.

Associating wait conditions to semaphores will now be described in more detail. Referring now to FIG. 2, in one embodiment of the invention, a first client 210 (hereinafter, "CLIENT A") waits on a first semaphore 215 (hereinafter, "SEMAPHORE 001") and a second client 220 (hereinafter, "CLIENT B") waits on a second semaphore 225 (hereinafter, "SEMAPHORE 002"). A synchronous interface engine 230, as may be similar to synchronous interface engine 130 of FIG. 1, receives a request from CLIENT A and associates a wait condition 212 including acquiring SEMAPHORE 001 (denoted by reference numeral 217). The synchronous interface engine 230 receives a result 214 and removes the wait condition 216 including releasing SEMAPHORE 001 (denoted by reference numeral 219).

Furthermore, the synchronous interface engine 230 receives a request from CLIENT B and associates a wait condition 222 including acquiring SEMAPHORE 002 (denoted by reference numeral 227). The synchronous interface engine 230 receives a result 224 and removes the wait condition 226 including releasing SEMAPHORE 002 (denoted by reference numeral 229).

Figure 3A:
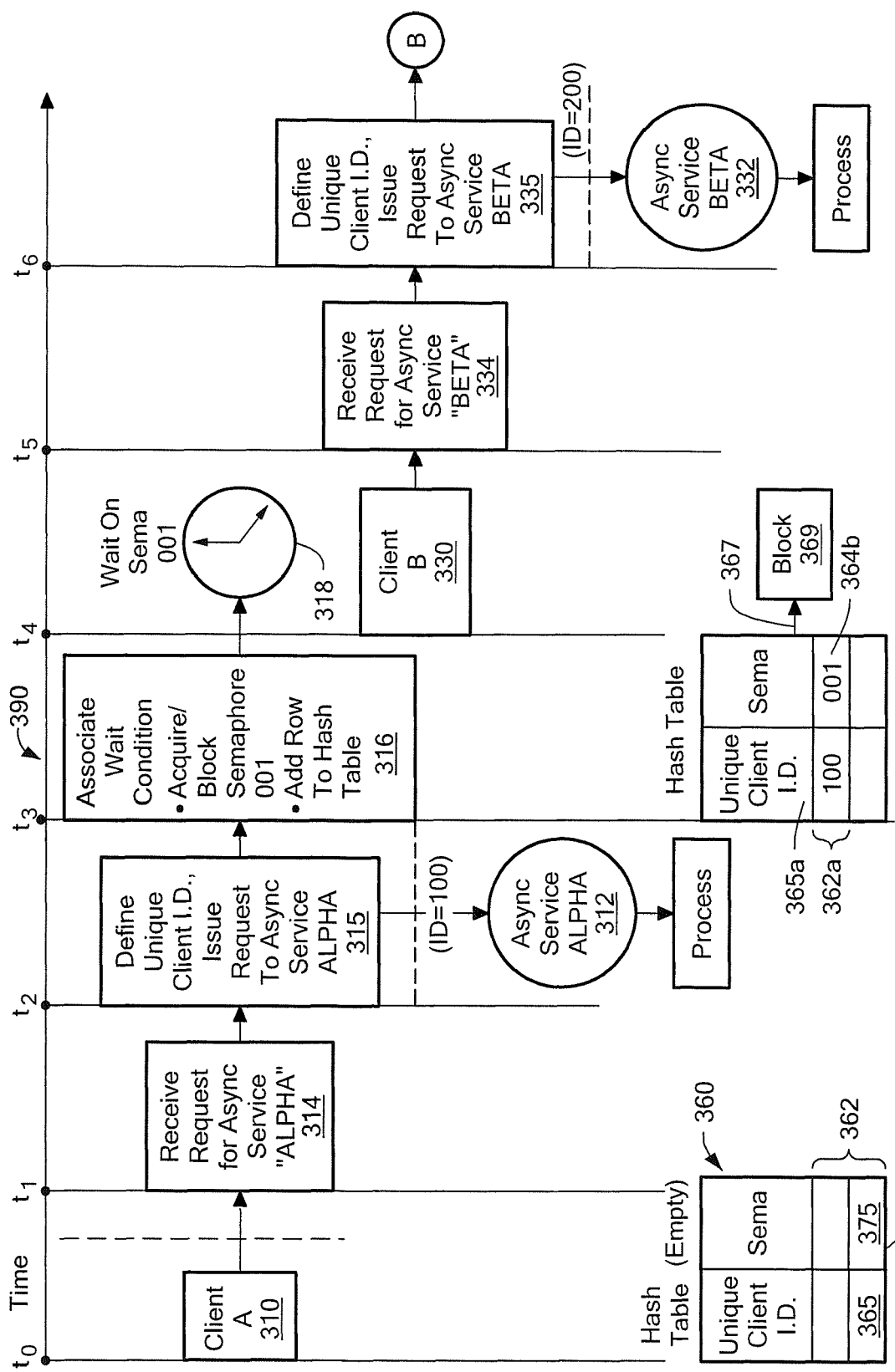
FIGS. 3A, 3B, and 3C illustrate a timeline of an embodiment of the method of FIG. 1 including a hash table.
Figure 3B:
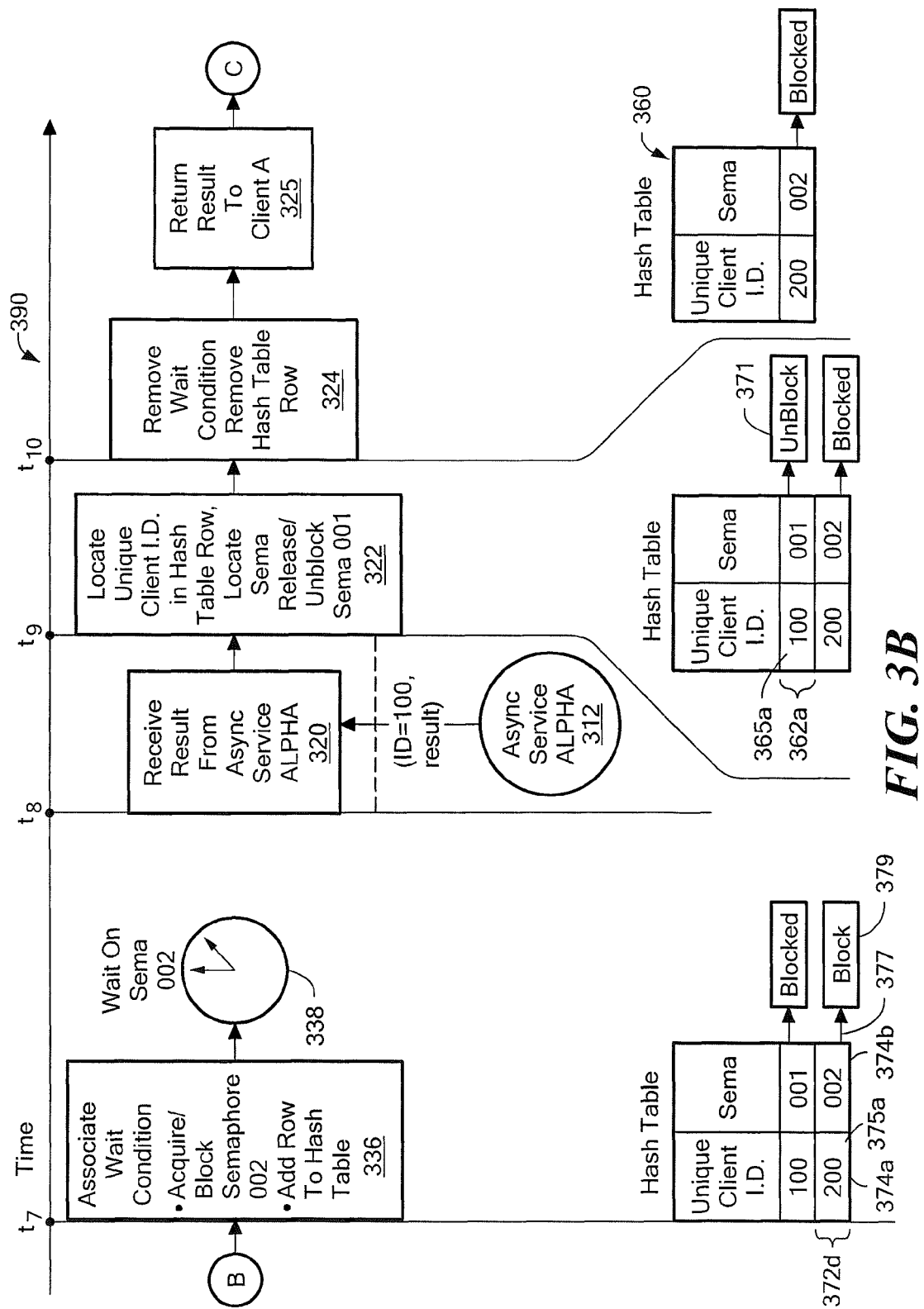
Figure 3C:
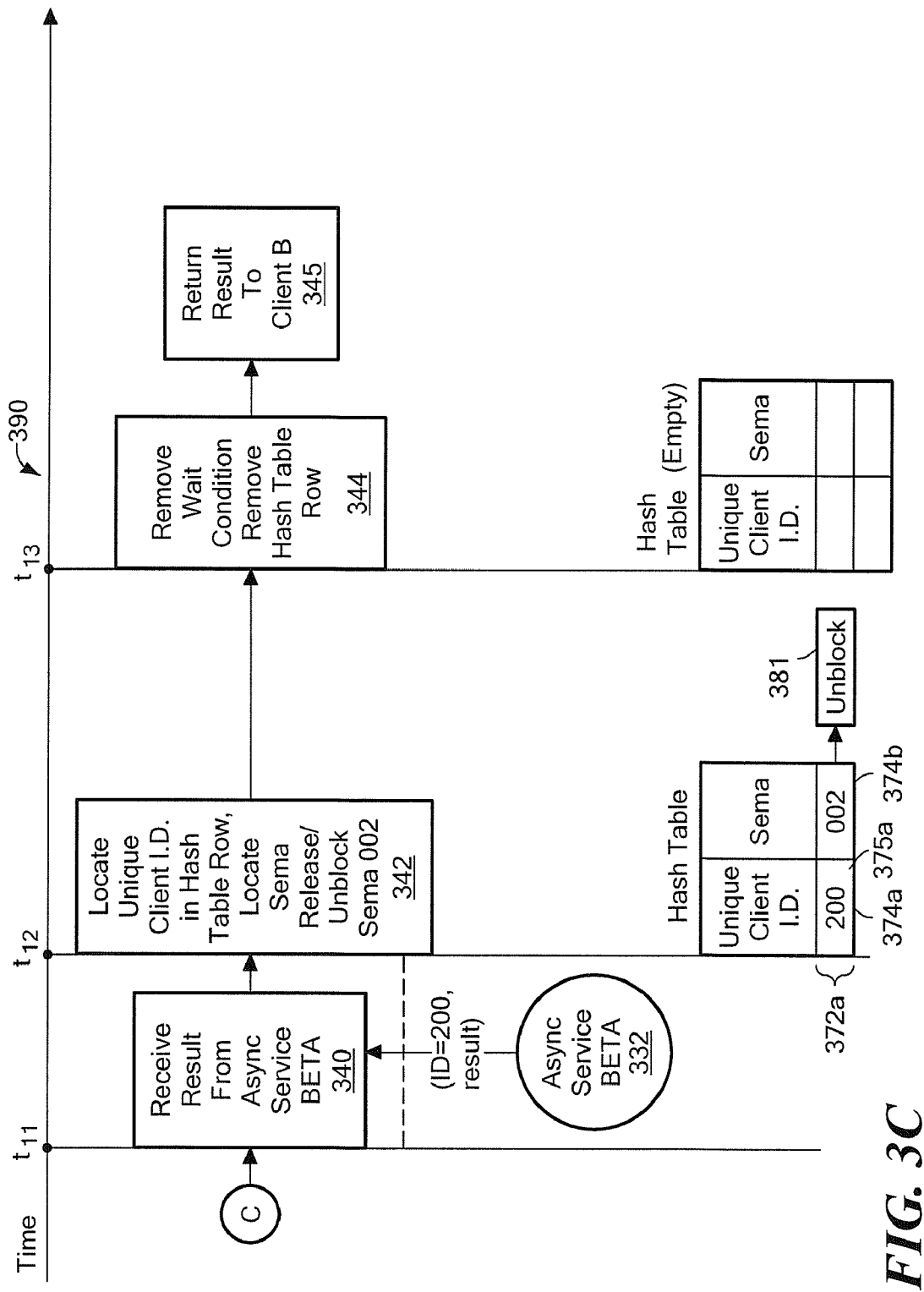

Referring now to each of FIGS. 3A, 3B, and 3C, a timeline 390 illustrates exemplary stages of a further embodiment of the method of FIG. 1 including representing client requests in a hash table 360. The hash table 360 includes rows (generally designated by reference numeral 362) and row elements (generally designated by reference numeral 364). The row elements 364 include an element for a unique client identifier 365, as may be similar to the unique client identifier 105 described in conjunction with FIG. 1, and a semaphore 375 representing the associated wait condition, as may be similar to the first or the second semaphore (215, 225) described in conjunction with FIG. 2.

The hash table 360 may be stored in a memory. In one embodiment, the hash table 360 is represented using a linked list or array of values stored in the memory. In another embodiment, the hash table 360 is represented using a relational database within a database management system.

Referring now to FIG. 3A, at time t0 of timeline 390, the hash tale 360 is empty, indicating that no clients are waiting for asynchronous services. A first client 310 (hereinafter, "CLIENT A") issues a first request for a first asynchronous service (hereinafter "SERVICE ALPHA"). At time t1, a synchronous interface engine, as may be similar to the synchronous interface engine 130 described in conjunction with FIG. 1, receives and begins to process the first request (stage 314).

At time t2, the synchronous interface engine defines a unique client identifier for CLIENT A (stage 315). In one embodiment, the unique client identifier is an alpha-numeric string of characters generated by a random generator. In still other embodiments, the unique client identifier is a primary key value of a table in a database. In this example, the unique client identifier for CLIENT A is the number 100.

The synchronous interface engine issues a request for SERVICE ALPHA, including the unique client identifier. A first service provider 312 receives and processes the request. At time t3, the synchronous interface engine associates a wait condition with CLIENT A (stage 316), including acquiring a first semaphore (hereinafter, "SEMAPHORE 001") and setting a block 369 on SEMAPHORE 001. The synchronous interface engine associates the wait condition by storing the unique client identifier 365a for CLIENT A in a first row element 364a of a first row 362a, and storing SEMAPHORE 001 in a second row element 364b of the first row 362a. In a further embodiment, a reference to the semaphore 367 is stored in the second row element 364b. This allows for the hash table to be stored in non-protected memory, while storing semaphores in protected memory.

At time t4, the synchronous interface engine begins to wait on SEMAPHORE 001 (stage 318). As described above, this may include remaining in a busy-wait condition until SEMAPHORE 001 unblocks. A second client 330 (hereinafter, "CLIENT B") issues a second request for a second asynchronous service (hereinafter, "SERVICE BETA"). At time t5, the synchronous interface engine receives and begins to process the second request (stage 334) and at time t6, the synchronous interface engine defines another unique client identifier (stage 335) for CLIENT B. In this example, the unique client identifier for CLIENT B is the number 200.

The synchronous interface engine issues a request for SERVICE BETA to a second service provider 332, which may be the same or different than the first service provider 312. The request includes the unique client identifier for CLIENT B. The second service provider 332 receives and processes the request.

Referring now to FIG. 3B, at time t7, the synchronous interface engine associates a wait condition with CLIENT A (stage 336), including acquiring a second semaphore (hereinafter, "SEMAPHORE 002") and setting a block 379 on SEMAPHORE 002. The synchronous interface engine associates the wait condition by storing the unique client identifier 375a for the CLIENT B in a second row element 374a of a second row 372a, and storing SEMAPHORE 002 in a second row element 374b of the second row 372a. In a further embodiment, a reference to the semaphore 377 is stored in the second row element 374b.

The synchronous interface engine begins to wait on SEMAPHORE 002 (stage 338). This may include remaining in a busy-wait condition until SEMAPHORE 002 unblocks.

At time t8, the synchronous interface engine receives a result (stage 320) from the first service provider 312, including the unique client identifier for CLIENT A, and at time t9, the synchronous interface engine locates the identifier 365a in row element 364a of hash table 360 and releases SEMAPHORE 001 in row element 364b including unblocking the semaphore 371 (stage 322). At time t10, the synchronous interface engine removes the wait condition for CLIENT A and removes the hash table row 362a (stage 324). At the end of stage 324, one row 372a remains in hash table 360 related to the second client request 330. The synchronous interface engine returns the result to CLIENT A (325).

Referring now to FIG. 3C, at time t11 the synchronous interface engine receives a result (stage 340) from the second service provider 322, including the unique client identifier for CLIENT B, and at time t12, the synchronous interface engine locates the identifier 375a in row 372a of hash table 360 and releases SEMAPHORE 002 in row element 374b including unblocking the semaphore 381 (stage 342). At time t13, the synchronous interface engine removes the wait condition for CLIENT A and removes the hash table row 372a (stage 344). At the end of stage 344, the hash table 360 is empty. The synchronous interface engine returns the result to CLIENT B (345).

Figure 4:
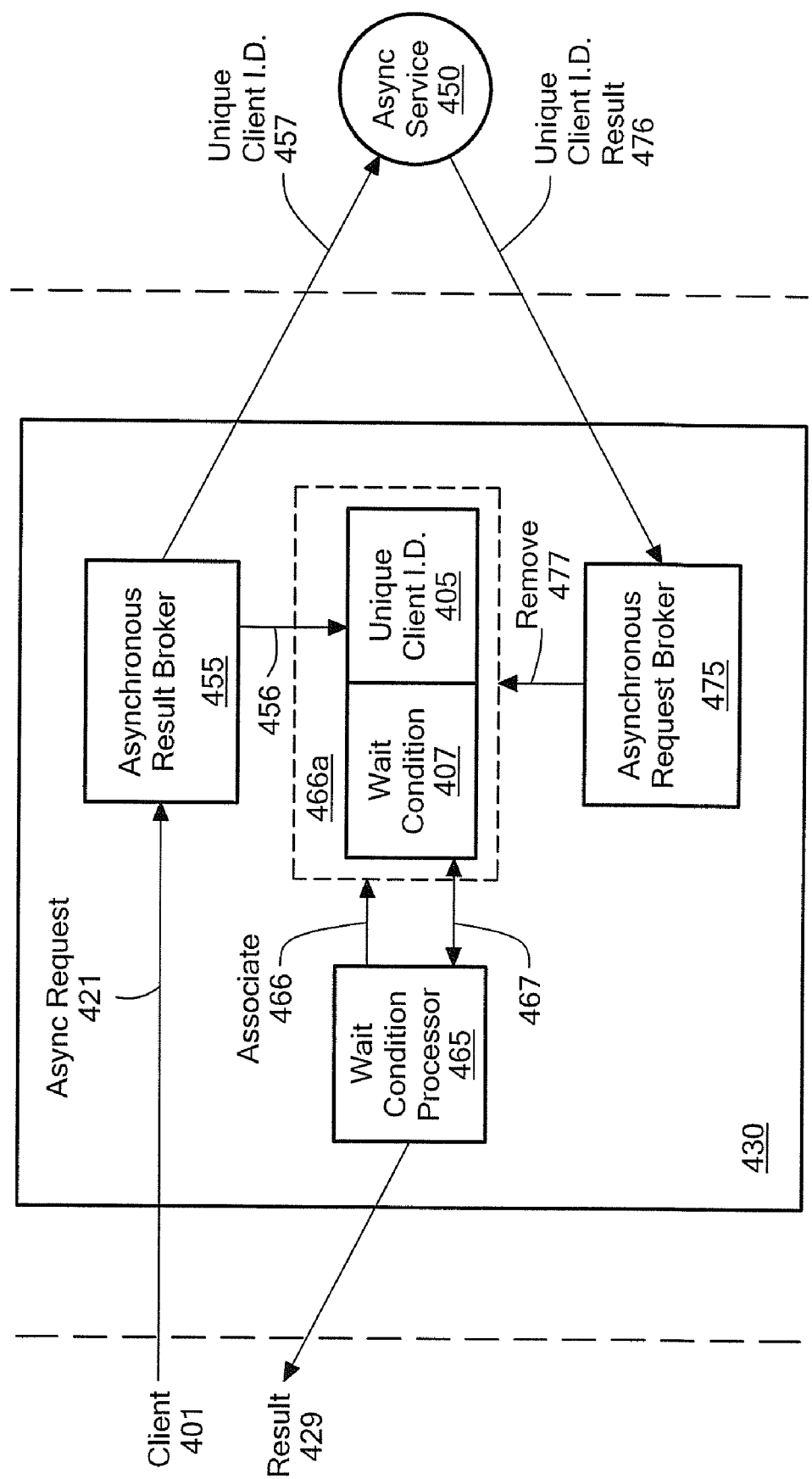
FIG. 4 is a block diagram of an apparatus for providing a synchronous interface for an asynchronous service.

Referring now to FIG. 4, in a further embodiment of the invention, a synchronous interface engine 430 receives request (line 421) from a client 401 to perform an asynchronous service 450. An asynchronous request broker 455 defines a unique client identifier 405 (line 456), and issues a request (line 457) to an asynchronous service 450. A wait processor 465 associates a wait condition 407 (line 466) with the unique client identifier 405. Such an association as generally designated in FIG. 4 by dashed-line box 466a.

In a further embodiment, the wait condition is represented by a semaphore, as may be similar to semaphore 215 and/or 225 described in conjunction with FIG. 2. In the same or different embodiment, the semaphore is acquired and a block is set on the semaphore.

The wait condition processor 465 waits for the removal of the wait condition 407 (line 467). The asynchronous service 150 performs the issued request and returns a result (line 476) to an asynchronous result broker 475. The asynchronous request broker 475 removes the wait condition 407 (line 477).

In above-mentioned embodiment in which the wait condition 407 is represented by a semaphore, removing the wait condition 407 includes removing the block on the semaphore and releasing the semaphore.

Upon removal of the wait condition 407, the wait condition process 465 uses the unique client identifier 405 associated with the wait condition 407 to identify the client 401 and sends the result back to the client 401 (line 429).

Figure 5:
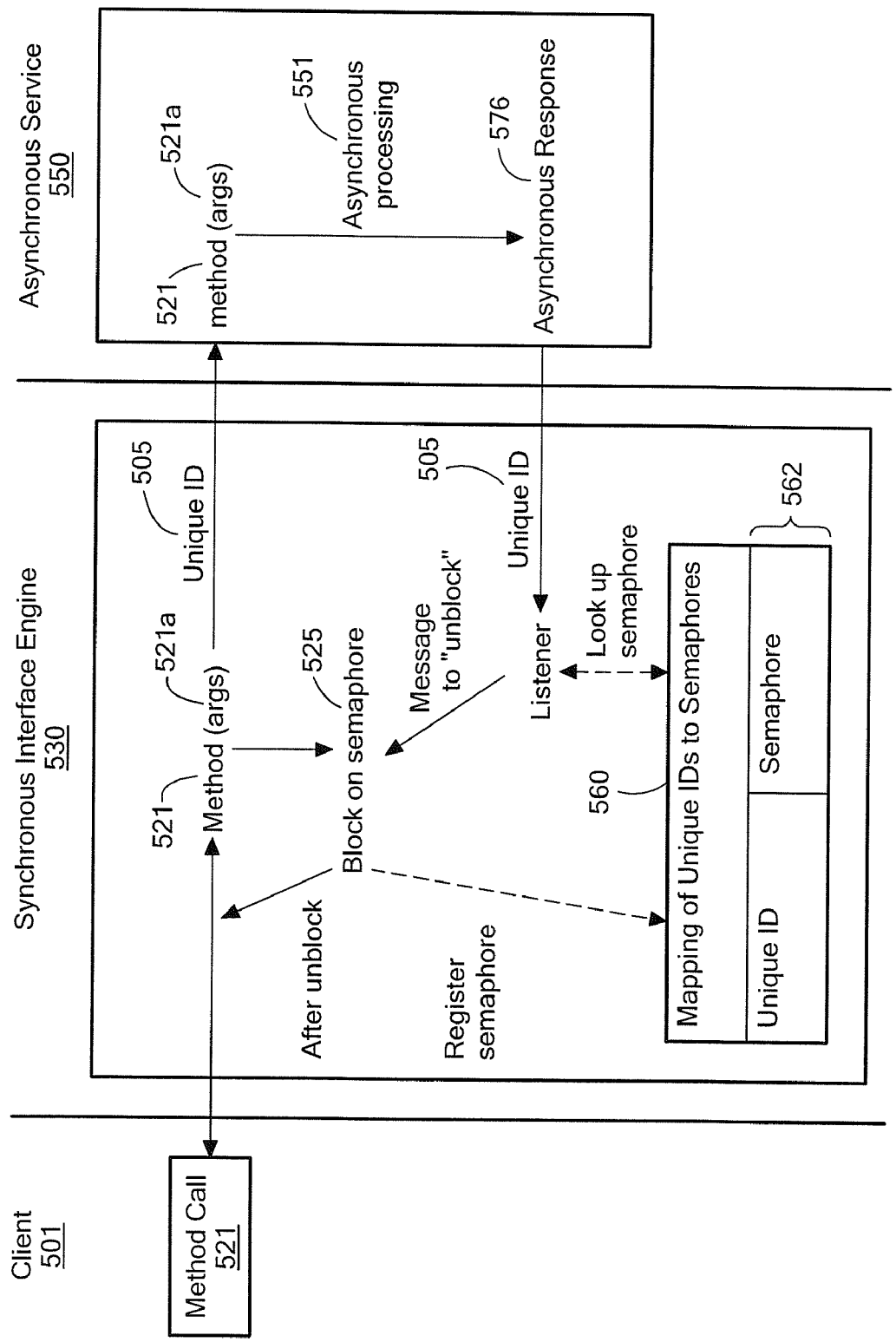
FIG. 5 is a block diagram depicting a more detailed embodiment of the inventive concepts described herein.

Referring now to FIG. 5, in still a further embodiment, a synchronous interface engine 530 receives a method call 521 from a client 501. The method call 521 is for an asynchronous service 550 and includes arguments 521a. The arguments 521a may include, but are not limited to, data values to pass to the asynchronous service 550.

The synchronous interface engine 530 sets a block on a semaphore 525 and registers the semaphore 525 in a table 560 that associates a unique client identifier 505 with the semaphore 525 in a row 562 of the table 560. The synchronous interface engine 530 issues a request to perform the method call 521, along with the arguments 521a and the unique client identifier 505, to an asynchronous service 550. The asynchronous service 550 performs processing 551 on the method call 521 and returns an asynchronous response 576 to a listener 509, along with the unique client identifier 505. The listener 509 looks up in the table 560 the semaphore 525 associated with the unique client identifier 505 and unblocks the semaphore 525. After the unblock, the result is sent to the client 501.

Figure 6:
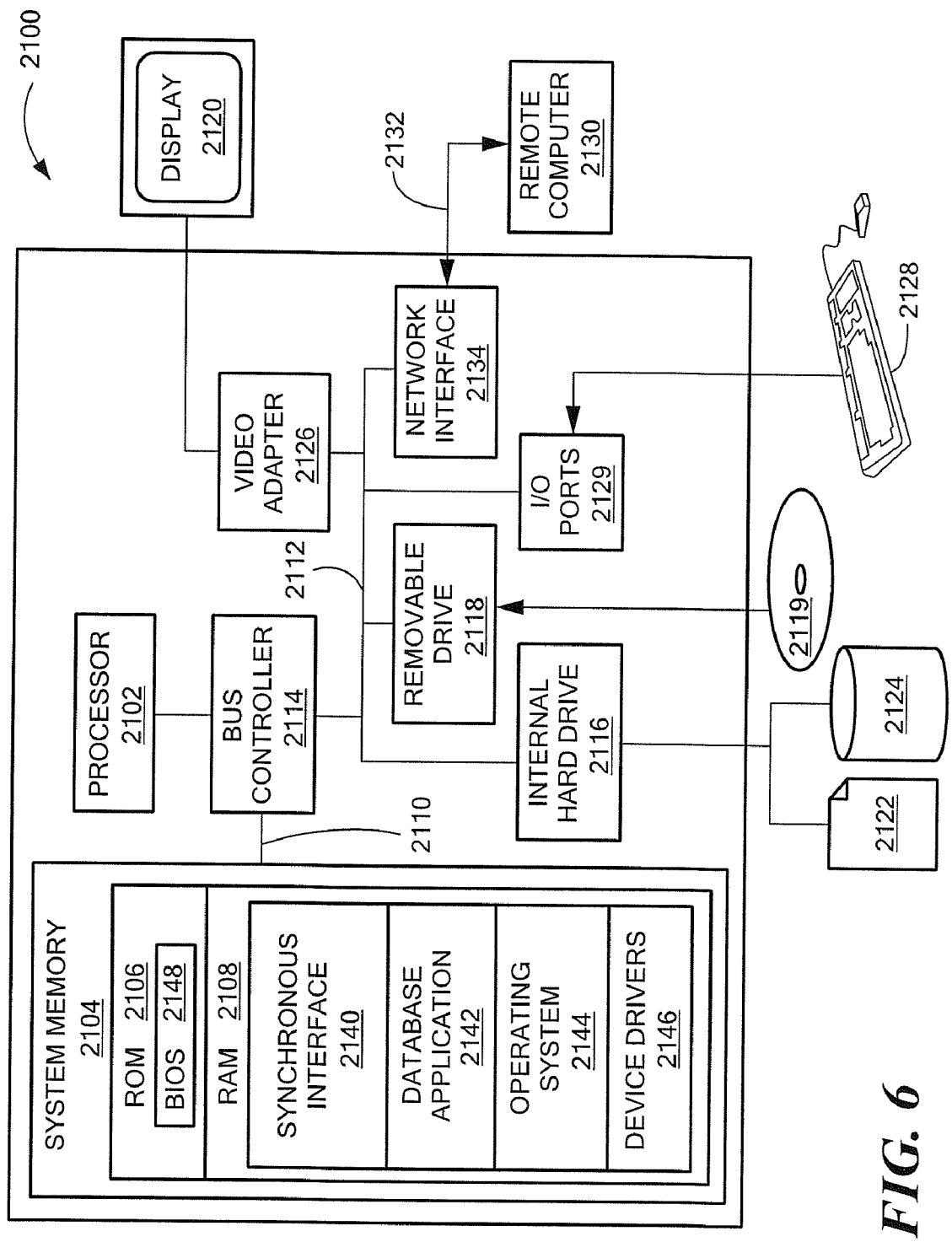
FIG. 6 is a diagram showing an exemplary hardware and operating environment of a suitable computer for use with embodiments of the invention.

FIG. 6 illustrates a computer 2100 suitable for supporting the operation of an embodiment of the inventive concepts described herein. The computer 2100 includes a processor 2102, for example, a dual-core processor, such as the AMD Athlon™ X2 Dual Core processor from the Advanced Micro Devices Corporation. However, it should be understood that the computer 2100 may use other microprocessors. Computer 2100 can represent any server, personal computer, laptop, or a battery-powered mobile device such as a hand-held personal computer, personal digital assistant, or smart phone.

Computer 2100 includes a system memory 2104 which is connected to the processor 2102 by a system data/address bus 2110. System memory 2104 includes a read-only memory (ROM) 2106 and random access memory (RAM) 2108. The ROM 2106 represents any device that is primarily read-only including electrically erasable programmable read-only memory (EEPROM), flash memory, etc. RAM 2108 represents any random access memory such as Synchronous Dynamic Random Access Memory (SDRAM). The Basic Input/Output System (BIOS) 2148 for the computer 2100 is stored in ROM 2106 and loaded into RAM 2108 upon booting.

Within the computer 2100, input/output (I/O) bus 2112 is connected to the data/address bus 2110 via a bus controller 2114. In one embodiment, the I/O bus 2112 is implemented as a Peripheral Component Interconnect (PCI) bus. The bus controller 2114 examines all signals from the processor 2102 to route signals to the appropriate bus. Signals between processor 2102 and the system memory 2104 are passed through the bus controller 2114. However, signals from the processor 2102 intended for devices other than system memory 2104 are routed to the I/O bus 2112.

Various devices are connected to the I/O bus 2112 including internal hard drive 2116 and removable storage drive 2118 such as a CD-ROM drive used to read a compact disk 2119 or a floppy drive used to read a floppy disk. The internal hard drive 2116 is used to store data, such as in files 2122 and database 2124. Database 2124 includes a structured collection of data, such as a relational database. A display 2120, such as a cathode ray tube (CRT), liquid-crystal display (LCD), etc. is connected to the I/O bus 2112 via a video adapter 2126.

A user enters commands and information into the computer 2100 by using input devices 2128, such as a keyboard and a mouse, which are connected to I/O bus 2112 via I/O ports 2129. Other types of pointing devices that may be used include track balls, joy sticks, and tracking devices suitable for positioning a cursor on a display screen of the display 2120.

Computer 2100 may include a network interface 2134 to connect to a remote computer 2130, an intranet, or the Internet via network 2132. The network 2132 may be a local area network or any other suitable communications network.

Computer-readable modules and applications 2140 and other data are typically stored on memory storage devices, which may include the internal hard drive 2116 or the compact disk 2119, and are copied to the RAM 2108 from the memory storage devices. In one embodiment, computer-readable modules and applications 2140 are stored in ROM 2106 and copied to RAM 2108 for execution, or are directly executed from ROM 2106. In still another embodiment, the computer-readable modules and applications 2140 are stored on external storage devices, for example, a hard drive of an external server computer, and delivered electronically from the external storage devices via network 2132.

The computer-readable modules 2140 may include compiled instructions for implementing a synchronous interface functionality as described herein. In a further embodiment, the computer 2100 may execute various components of a synchronous interface engine as may be similar to synchronous interface engine 130 described in conjunction with FIG. 1. In still a further embodiment, the synchronous interface engine implements the components on different processors, for example, a first processor and a second processor. For example, the first processor implements an asynchronous request broker and an asynchronous result broker and the second processor implements a wait condition processor (see FIG. 4). Advantageously, the division of processing saves time and overhead and allows for components to execute asynchronously. For example, the wait condition processor may busy-wait on a wait condition, as may be represented by semaphore 215 and/or 225 described in conjunction with FIG. 2, while the asynchronous request broker and result broker issue and respond to asynchronous services.

Furthermore, synchronous interface engine data may be saved in internal hard drive storage 2116, read-in from removable drive 2118, or received via the network 2132 from remote computer 2130, and loaded into RAM 2108. For example, unique client identifiers and hash tables, as may be similar to those described in conjunction with FIGS. 3A, 3B, and 3C, may be loaded into RAM 2108. The semaphores may be saved in a protected memory, for example, a portion of the RAM 2108 that user processes, input/output devices, etc. may not read, write, or modify.

In a further embodiment, the first and second processors described above may be respective processors of a dual-core processor. Alternatively, the first and second processor may respective first and second computing devices. Output of the first and/or second processors may be rendered on display 2120.

The computer 2100 may execute a database application 2142, such as Oracle™ database from Oracle Corporation, to model, organize, and query data stored in database 2124. The data may be used by the computer-readable modules and applications 2140 and/or passed over the network 2132 to the remote computer 2130 and other systems.

In general, the operating system 2144 executes computer-readable modules and applications 2140 and carries out instructions issued by the user. For example, when the user wants to execute a computer-readable module 2140, the operating system 2144 interprets the instruction and causes the processor 2102 to load the computer-readable module 2140 into RAM 2108 from memory storage devices. Once the computer-readable module 2140 is loaded into RAM 2108, the processor 2102 can use the computer-readable module 2140 to carry out various instructions. The processor 2102 may also load portions of computer-readable modules and applications 2140 into RAM 2108 as needed. The operating system 2144 uses device drivers 2146 to interface with various devices, including memory storage devices, such as hard drive 2116 and removable storage drive 2118, network interface 2134, I/O ports 2129, video adapter 2126, and printers.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
   in a synchronous interface engine executing on a processor to provide the synchronous interface, receiving a first request from a first client for a first asynchronous service;

issuing a first asynchronous service request to perform the first asynchronous service, the first asynchronous service request including a first unique client identifier associated with the first client;
associating a first wait condition with a first semaphore and the first unique client identifier to indicate to the first client to wait for a first result of the first asynchronous service, the associating comprising representing the first request in a first row of a hash table comprising:
the first unique client identifier; and
the first semaphore representing the associated first wait condition;
acquiring the first semaphore;
representing a second request associated with a second client in a second row of the hash table comprising a second unique client identifier associated with the second client and a second semaphore representing an associated second wait condition;
receiving the first result of the first asynchronous service, the first result including the first unique client identifier;
removing the associated first wait condition comprising:
locating the first unique client identifier in the first row of the hash table; and
releasing the first semaphore represented in the first row of the hash table; and
sending the first result to the first client.

2. The method of claim 1, wherein the first client waits until the first semaphore is released.

3. The method of claim 1 further comprising:
in an asynchronous request broker, receiving a request from a client for the asynchronous service, associating a unique client identifier with the client, and issuing an asynchronous service request to perform the asynchronous service, the asynchronous service request including the unique client identifier;
in a wait condition processor, associating a wait condition with the unique client identifier to indicate to the client to wait for a result of the asynchronous service, and;
in an asynchronous result broker, receiving the result of the asynchronous service, the result including the unique client identifier, and removing the associated wait condition,
wherein upon removing of the associated wait condition, the wait condition processor sends the result to the client.

4. An apparatus, comprising:
a microprocessor;
a synchronous interface engine executing on the microprocessor to provide the synchronous interface, comprising:
an asynchronous request broker configured to:
receive a first request from a first client for a first asynchronous service;
associate a first unique client identifier with the first client; and
issue a first asynchronous service request to perform the first asynchronous service, the first asynchronous service request including the first unique client identifier;
a wait condition processor configured to:
associate a first wait condition with a first semaphore and the first unique client identifier to indicate to the first client to wait for a first result of the asynchronous service, associate the first wait condition comprises representing the first request in a first row of a hash table comprising the first unique client identifier and the first semaphore representing the associated first wait condition;
acquire the first semaphore;
represent a second request associated with a second client in a second row of the hash table comprising a second unique client identifier associated with the second client and a second semaphore representing an associated second wait condition; and
an asynchronous result broker configured to:
receive the first result of the first asynchronous service, the first result including the first unique client identifier; and
remove the first associated wait condition comprising:
locating the first unique client identifier in the first row of the hash table; and
releasing the first semaphore represented in the first row of the hash table row,
wherein upon removing of the first associated wait condition, the wait condition processor sends the first result to the first client.

5. The apparatus of claim 4, wherein the wait condition processor waits until the first semaphore is released.

6. An article, comprising:
a non-transitory storage medium having stored instructions thereon that when executed by a machine result in a synchronous interface for an asynchronous service enabling:
in a synchronous interface engine executing on a processor to provide the synchronous interface, receiving a first request from a first client for a first asynchronous service;
issuing a first asynchronous service request to perform the first asynchronous service, the first asynchronous service request including a first unique client identifier associated with the first client;
associating a first wait condition with a first semaphore and the first unique client identifier to indicate to the first client to wait for a first result of the first asynchronous service, the associating comprising representing the first request in a first row of a hash table comprising:
the first unique client identifier; and
the first semaphore representing the associated first wait condition;
acquiring the first semaphore;
representing a second request associated with a second client in a second row of the hash table comprising a second unique client identifier associated with the second client and a second semaphore representing an associated second wait condition;
receiving the first result of the first asynchronous service, the first result including the first unique client identifier;
removing the associated first wait condition comprising:
locating the first unique client identifier in the first row of the hash table; and
releasing the first semaphore represented in the first row of the hash table; and
sending the first result to the first client.

7. The article of claim 6, wherein the client waits until the first semaphore is released.

8. The method of claim 1, further comprising:
in the synchronous interface engine, receiving the second request from the second client for a second asynchronous service;
issuing a second asynchronous service request to perform the second asynchronous service, the second asynchronous service request including the second unique client identifier associated with the second client; and associating the second wait condition with the second semaphore and the second unique client identifier to indicate to the second client to wait for a second result of the second asynchronous service.

9. The method of claim 8, further comprising:
acquiring the second semaphore;
receiving the second result of the second asynchronous service, the second result including the second unique client identifier;
removing the associated second wait condition comprising:
   locating the second unique client identifier in the second row of the hash table; and
   releasing the second semaphore represented in the second row of the hash table; and
sending the second result to the second client.

10. The apparatus of claim 4 wherein the asynchronous request broker is further configured to:
receive the second request from the second client for a second asynchronous service;
associate a second unique client identifier with the second client; and
issue a second asynchronous service request to perform the second asynchronous service, the second asynchronous service request including the second unique client identifier.

11. The apparatus of claim 10 wherein the wait condition processor is further configured to:
associate a second wait condition with a second semaphore and the second unique client identifier to indicate to the second client to wait for a second result of the asynchronous service; and
acquire the second semaphore.

12. The apparatus of claim 11 wherein the asynchronous result broker is further configured to:
receive the second result of the second asynchronous service, the second result including the second unique client identifier; and
remove the second associated wait condition comprising:
   locating the second unique client identifier in the second row of the hash table; and
   releasing the second semaphore represented in the second row of the hash table,
wherein upon removing of the second associated wait condition, the wait condition processor sends the second result to the second client.

13. The article of claim 6 wherein the storage medium further comprises instructions enabling:
in the synchronous interface engine, receiving the second request from the second client for a second asynchronous service;
issuing a second asynchronous service request to perform the second asynchronous service, the second asynchronous service request including the second unique client identifier associated with the second client; and
associating the second wait condition with the second semaphore and the second unique client identifier to indicate to the second client to wait for a second result of the second asynchronous service.

14. The article of claim 13 wherein the storage medium further comprises instructions enabling:
acquiring the second semaphore;
receiving the second result of the second asynchronous service, the second result including the second unique client identifier;
removing the associated second wait condition comprising:
   locating the second unique client identifier in the second row of the hash table; and
   releasing the second semaphore represented in the second row of the hash table; and
sending the second result to the second client.

* * * * *